United States Patent
Burke (10) Patent No.: US 12,513,222 B2
(45) Date of Patent: Dec. 30, 2025

(54) PUBLISHING AND SYNCHRONIZATION TECHNIQUES

(71) Applicant: NCR Voyix Corporation, Atlanta, GA (US)

(72) Inventor: Taylor Dixon Burke, Atlanta, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 17/966,392

(22) Filed: Oct. 14, 2022

(65) Prior Publication Data

US 2023/0042861 A1  Feb. 9, 2023

Related U.S. Application Data (63) Continuation of application No. 16/226,301, filed on Dec. 19, 2018, now Pat. No. 11,553,056.

(51) Int. Cl.
| | |
|---|---|
| G06Q 30/00 | (2023.01) |
| G06Q 30/0207 | (2023.01) |
| G06Q 30/0601 | (2023.01) |
| H04L 12/18 | (2006.01) |
| H04L 67/55 | (2022.01) |

(52) U.S. Cl.
CPC ......... *H04L 67/55* (2022.05); *G06Q 30/0207* (2013.01); *G06Q 30/0623* (2013.01); *H04L 12/1859* (2013.01)

(58) Field of Classification Search
CPC ............ G06Q 30/0207; G06Q 30/0623
USPC ................................. 705/26.1–27.2
See application file for complete search history.

(56) References Cited

U.S. PATENT DOCUMENTS

2016/0085824 A1 * 3/2016 Chadha ............... G06F 16/9535
707/706

OTHER PUBLICATIONS

Cheemalapati, Srinivas, et al., Hybrid Cloud Data and API Integration: Integrate Your Enterprise and Cloud with Bluemix Integration Services:, Nov. 17, 2015, IBM Redbooks. (Year: 2015).*
U.S. Appl. No. 16/226,301 U.S. Pat. No. 11,553,056, filed Dec. 19, 2018, Publishing and Synchronization Techniques.
"U.S. Appl. No. 16/226,301, Advisory Action mailed Jul. 6, 2021", 3 pgs.
"U.S. Appl. No. 16/226,301, Final Office Action mailed Apr. 21, 2021", 14 pgs.
"U.S. Appl. No. 16/226,301, Non Final Office Action mailed Mar. 2, 2022", 10 pgs.
"U.S. Appl. No. 16/226,301, Non Final Office Action mailed Oct. 5, 2020", 15 pgs.
"U.S. Appl. No. 16/226,301, Notice of Allowance mailed Sep. 30, 2022", 10 pgs.
"U.S. Appl. No. 16/226,301, Response filed Jan. 5, 2021 to Non Final Office Action mailed Oct. 5, 2020", 9 pgs.
(Continued)

*Primary Examiner* — Anand Loharikar
(74) *Attorney, Agent, or Firm* — Schwegman Lundberg & Woessner, P.A.

(57) ABSTRACT

Upon detection of a change in value to a data asset, customized rules are processed to publish the change and other information pertaining to the data asset with one or more services/devices. In an embodiment, the change and other information are dynamically pushed to a mobile device when the mobile device is in a predefined geographical area as defined by the customized rules.

8 Claims, 4 Drawing Sheets

(56) References Cited

OTHER PUBLICATIONS

"U.S. Appl. No. 16/226,301, Response filed Jun. 2, 2022 to Non Final Office Action mailed Mar. 2, 2022", 7 pgs.
"U.S. Appl. No. 16/226,301, Response filed Jun. 21, 2021 to Final Office Action mailed Apr. 21, 2021", 7 pgs.
Cheemalapati, Srinivas, et al., "Hybrid Cloud Data and API Integration: Integrate Your Enterprise and Cloud with Bluemix Integration Services", IBM Red books, (Nov. 17, 2015), 276 pgs.

* cited by examiner

PUBLISHING AND SYNCHRONIZATION TECHNIQUES

CROSS-REFERENCE TO RELATED APPLICATION

This application is a continuation of U.S. patent application Ser. No. 16/226,301, filed Dec. 19, 2018, which application and publication is incorporated herein by reference in its entirety.

BACKGROUND

Many enterprises outsource their data assets to network-based third-party services. This allows the enterprises to focus on their core competency while their data assets are hosted and maintained by competent third-party technology-based companies. However, because the enterprises lack control over the third-party environment, very minimal technological advancements are being made with respect to services offered to customers of the enterprises.

Furthermore, technology has made business hyper competitive and each enterprise is looking for a technological edge to obtain and retain customers.

SUMMARY

In various embodiments, methods and a system for publishing and synchronization of data assets are presented.

According to an embodiment, a method for publishing and synchronization of data assets is presented. Upon detection of a change in value in a data asset, customized rules are obtained for processing the change. The customized rules are processed to deliver the change and other data assets related to the data asset to one or more services defined in the customized rules.

DETAILED DESCRIPTION

Figure 1:
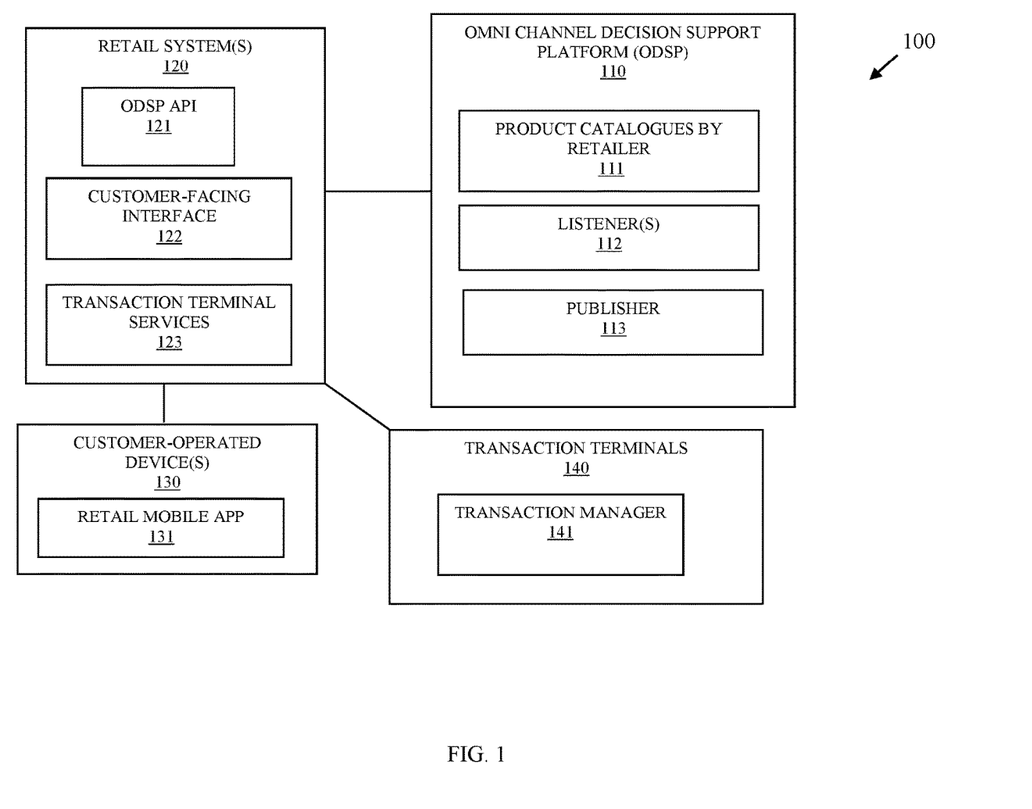
FIG. 1 is a diagram of a system for publishing and synchronization of data assets, according to an example embodiment.

FIG. 1 is a diagram of a system 100 for publishing and synchronization of data assets, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the techniques of publishing and synchronization of data assets, presented herein and below.

As used herein and below, the terms "customer," "consumer," and "user" may be used interchangeably and synonymously.

Further, a "data asset" refers to information that an enterprise tracks in a data store for some aspect relevant to the enterprise.

The system 100 includes an Omni-Channel Decision Support Platform (ODSP) having: product/services catalogues by specific retailer 111 (herein after just "catalogue 111" or "catalogues 111"), one or more data asset listeners 112, and a synchronizer or publisher 113.

The system 100 further includes a plurality of retail systems 120, each retail system 120 including, at least, an ODSP Application Programming Interface (API) 121, a customer-facing interface 122, and transaction terminal services 123.

The system 100 also, optionally, includes one or more customer-operated devices 130 having a retail mobile application 131.

Further, the system 100 also, optionally, includes a plurality of transaction terminals 140, each transaction terminal including a transaction manager 141.

The listeners 111 and the publisher 113 are provided as executable instructions that reside in a non-transitory computer-readable storage medium and are executed on a hardware processor of servers associated with the ODSP 110. Additionally, the customer-facing interfaces 122 and the transaction terminal services 123 are provided as executable instructions executed by hardware processors of servers associated with each of the retail systems 120. Still further, the retail mobile application ("app") 131 are provided as executable instructions that are executed by a processor of each of the customer-operated devices 130. Finally, the transaction managers 141 are provided as executable instructions that are executed by a processor of each of the transaction terminals 140.

The retail systems 120 process the ODSP APIs 121 to interface with the ODSP 110 and house data assets of the retailers. Some of the data assets that are relevant to product/service descriptions are stored in retailer-specific catalogues 111 maintained in the ODSP 110. Such data assets can include information relevant to: inventory of the product/services, item codes for the products/services that uniquely identifies each product/service, unit price information for each of the item codes, retail location information for each of the item codes, current discounts/offers for each item code, and/or retail unit (division, store number, etc.) for each of the item codes.

The listeners 112 are customizable programs that can work with a single retailer system 120 or span multiple different retailer systems 120. Each listener 112 is configured to monitor changes made to the data assets by one of the retail systems 120 in the catalogues 111 and provide any such changes to the publisher 113.

The publisher 113 is a customizable program that is configured to dynamically push (push-based processing) a change reported by a listener 112 to the ODSP API 121 for a specific or set of retail systems 120. The publisher 113 may also be configured wait for a request (pull-based processing) made by any of the APIs 121 before providing a change reported by a listener 112 to the requesting APIs 121. In this way, the publisher 113 is a selective and customizable synchronization service for the data assets.

Once a data asset change is acquired by a corresponding API 121 of a corresponding retail system 120, customized retail-specific rules can be processed to determine "how," "where," and "when" the data asset change is to be reported to specific customer devices 130 via the mobile app 131 and the transaction terminals 140 via the transaction manager 141. Once the "how," "where," and "when" are resolved by processing the rules, the API 121 provides the changed data asset notification in the proper format and with the proper processing instructions to one of or both of the customer-facing interface 122 and the transaction terminal services 123 for delivery to customer(s) and/or transaction terminals 140.

The "how" can be identified in the rules as being the communication channel (automated text, mobile-based message, email, social-media positing, kiosk-based message, Point-Of-Sale (POS)-based message, and/or digital sign-based message) for which the data asset change is being sent over (which dictates the data format and addressing used when the data asset change is communicated).

The "where" can be identified in the rules as being the device(s) that is to receive the data asset change notification, such as: 1) a specific customer device 130, a specific set of customer devices 130 (customer segment), and/or all customer devices 130; 2) a specific retail-transaction terminal 140 (or set of terminals 140) located in a specific geographic location, region, or area or set of locations, regions, or areas; 3) a specific transaction terminal 140 associated with a specific or set of lines-of-businesses for the retailer; and/or 4) all transaction terminals 140.

The "when" can be identified in the rules as being the time with which the data alert change is to be communicated, such as timing that is: 1) immediate upon receipt and notification provided by the publisher 113; 2) upon detection of a specific customer entering a geofenced area (through location information provided by the app 131); and/or 3) upon detection of a customized event (e.g., customer is performing a checkout at one of the terminals 140, customer is performing an online checkout via a customer-operated device 130, customer is identified as logging into customer's account with the retailer either by activating the app 131 or through a browser-based customer-facing interface associated with a different device, a setting defined in a customer profile for the customer (set by the customer or set based on metrics retailed for the customer in the profile), current sales reported by the transaction terminals 140 falling below a predefined threshold value (indicating that traffic at a particular store is low or lighter than what is expected), and/or any other customized event).

The "how," "where," and "when" can all be provided through customized files that are read to obtain values for conditions and the values are then evaluated in the rules, such that changes to the programming logic or source code of the customer-facing interfaces 122 and transaction terminal services 123 do not have to be made when any of the "how," "where," and/or "when" are changed by the retailer.

A sample rule evaluated by the API 121 upon notification of a data asset change in a catalogue reported by the publisher 113 may appear as follows:

If
DATA_ASSET_VALUE!=LAST_DATA_ASSET_VALUE, then NOTICE=HOW (DATA_ASSET_VALUE) and on TIME=WHEN send NOTICE to WHERE.

The capitalized terms above of: LAST_DATA_ASSET_VALUE, NOTICE, and TIME are maintained by the API 121. The capitalized term HOW is a function that returns the channel-specific format for the data asset value. The capitalized term DATA_ASSET_VALUE is what is provided to the API 121 from the publisher 113. The capitalized term WHEN is obtained from a table/file at runtime based on a data asset value type.

Tables and files can be used and indexed to customize how specific data asset value types are reported. In an embodiment, the data asset value type is an item code from the catalogue for a specific product/service. Furthermore, tables that link the item code to specific customers that requested notifications on a price change may be dynamically maintained, such that when the price changes for a subscribed product (data asset change), the table links the item code price change directly to a specific customer identifier (providing the WHERE). In a similar manner, the WHEN can be customer/user defined upon subscribing to a price change data asset notification. For example, the customer may indicate that when the customer is within 100 feet of a store (or specific store that includes the product) the customer is to receive a notification of the price change for the product.

This is but one example and is presented for purposes of illustration only. There are other ways to used tables/files and customized rules to dynamically determine "how," "where," and "when" a specific data asset change ("what") is synchronized, pushed, or otherwise provided to devices 130 and/or terminals 140. All such variations are intended to fall within the generous scope of the embodiments for the invention provided herein.

The customized rules can be customized by the retailers and/or by the customers of the retailers (an example illustration of a customer-defined customized rule was presented above). Accordingly, separate interfaces or a same interface may be provided within the APIs 121 and/or the mobile apps 131 for subscribing to data asset alerts and producing the customized rules. A retailer, though marketing campaigns, may custom create the rules by using the above-mentioned interface. Similarly, a customer/user can create the rules by using an interface that is enhanced to interact with the customer-facing interface 122 and define the rules with the API 121.

The API 121 may also set notification rules for which notification of specific data asset changes are provided from the publisher to the API 121. The notification rules can define for the publisher when data asset changes are to be sent to the API 121, such as: 1) as soon as detected, in predefined intervals, 2) when any change in value for a data asset exceeds a threshold difference (e.g., the price (data asset value) was reduced by more than 10% for its previous known value), 3) only when requested by the API 121, and the like.

Furthermore, the retailer of one system 120 may desire notification when a competing retailer of a different and disparate retailer system 120 changes a data asset value (changes a price for a given data asset value type (item code or item description). The publisher 113 can report these cross-retailer price changes to the requesting retailer system 120. This may be when a retailer agrees to honor the lowest price for an item (product) of all its competitors. This embodiment, assumes that there are no retail contract provisions that prohibit such notifications, but from a technological standpoint, the system 100 is able to provide such cross retailer price change notifications to requesting retailer systems 120. When contract provisions prohibit such notifications, if both retailers (the price changer and the price requestor) have agreed to waive such conditions, then the system 100 can provide the notifications.

Additionally, the rules (provided by the API 121 or the publisher 113 as discussed above) can include the type of information to provide with the data asset change. That is, a data asset type (such as an item code or item description) is recorded in the catalogue 111 as a record of information that can include store location for the item, store name, the offer, any offer conditions (e.g., until 12 pm on date D, only if 2 are purchased, etc.), and the like.

Accordingly, "what" is reported by the publisher 113 can be defined by data asset type (such as item code, retailer identifier, store location, a collection of multiple item codes, etc.), "how," "where," and "when" can be custom defined through the APIs 120, and the amount and type of reported information from the data asset record can be custom defined.

The system 100 is particularly useful as a mechanism to entice customers to purchase items (products) because customers can receive (if desired) real-time price change notifications for such items. The prices are data asset values and the item codes (descriptions) for the items are the data asset types. The information available in a data asset record includes store location, store name, quantity of item in inventor, etc. Therefore, not only can the price changes themselves be provided but other useful information as to the specific store location and store name can be communicated to the customer through the app 131. As stated before, the notification can also be driven based on a current geographical location of the customer (based on location information reported by the app 131), such that customers can be notified in locations where they are likely to buy the item (such as when the customers are in the store or near the store having the reduced price for the item). Furthermore, the system 100 can be used by the customers directly to subscribe to items (data asset types) and have customized information reported in a manner that can be completely customer-defined.

In an embodiment, a collection of data asset types (items) from the catalogues 111 can be reported out on price changes as a list of data asset changes by the publisher 113 for: a given retailer, collection of retailers, and/or for a given geographical area.

In an embodiment, each of the retail systems 120 include a plurality of other services, such as customer-relationship management (CRM) services, and the API 121 and/or the publisher 113 are configured to provide the notification in changes to values in the data assets to those other services in a format that can be processed by those services.

In an embodiment, the publisher 113 can directly provide the processing described above with respect to the API 121, such that the publisher 113 provides the interface for the customized rules on "how," "where," and "when" for a customer-defined "what" (data asset type, such as item code) and the publisher 113 sends the notifications to the apps 131 of devices 130 and/or the transaction managers 141 of transaction terminals 140. Thus, the API 121 processing is subsumed into the publisher 113.

In an embodiment, the devices 130 include; phones, tablets, desktops, wearable processing devices, network-based voice devices (e.g., GOOGLE HOME®, AMAZON ECHOR, APPLE SIRI®, etc.), and processing an network-enabled appliances (Internet-of-Things (IoTs)).

In an embodiment, the terminals 140 include: SSTs, ATMs, kiosks, and POS terminals.

In an embodiment, the ODSP 110 is a collection of servers logically organized in a cloud-computing environment.

In an embodiment, the retail systems 120 is a collection of servers logically organized in a cloud-computing environment.

The aforementioned embodiments and other embodiments are now discussed with reference to the FIGS. 2-4.

Figure 2:
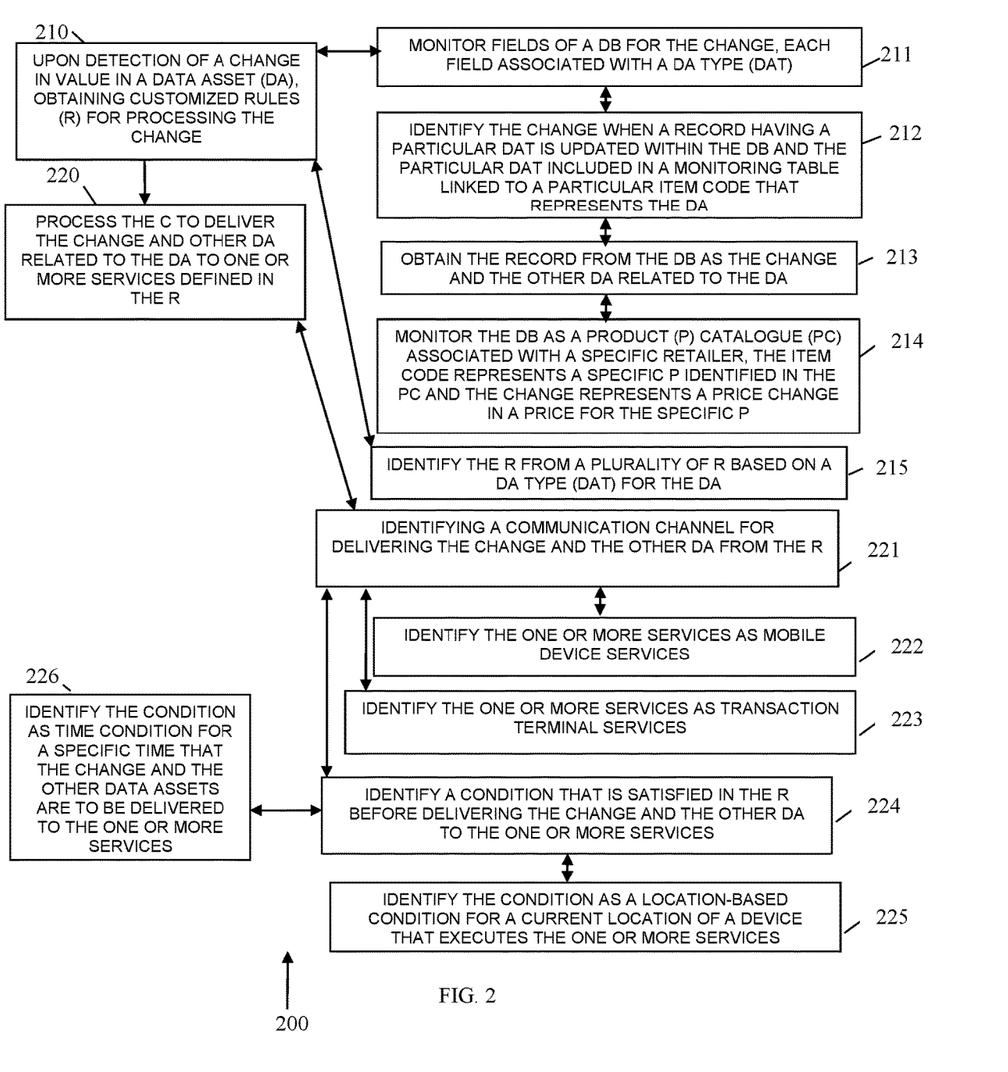
FIG. 2 is a diagram of a method for publishing and synchronization of data assets, according to an example embodiment.

FIG. 2 is a diagram of a method 200 for publishing and synchronization of data assets, according to an example embodiment. The software module(s) that implements the method 200 is referred to as a "data asset notification manager." The data asset notification manager is implemented as executable instructions programmed and residing within memory and/or a non-transitory computer-readable (processor-readable) storage medium and executed by one or more processors of a device. The processor(s) of the device that executes the data asset notification manager are specifically configured and programmed to process the data asset notification manager. The device that executes the data asset notification manager has access to one or more network connections during its processing. The network connections can be wired, wireless, or a combination of wired and wireless.

In an embodiment, the device that executes the data asset notification manager is a collection of servers logically cooperating as the ODSP 110. In an embodiment, the servers form a cloud-computing environment that services multiple retailer systems 120, multiple customer-operated devices 130, and/or multiple transaction terminals 140 of retailers.

In an embodiment, the data asset notification manager is a combination of: the listener 112, the publisher 113, and/or the API 121 configured to perform the processing discussed above with the FIG. 1.

At 210, the data asset notification manager upon detection of a change in value in a data asset, obtains customized rules for processing the detected change in value.

In an embodiment, at 211, the data asset notification manager monitors fields of a database for the change, each field is associated with a data asset type.

In an embodiment of 211 and at 212, the data asset notification manager identifies the change when a record having a particular data asset type is updated within the database and the particular data asset type is included in a monitoring table linked to a particular item code that represents the data asset.

In an embodiment of 212 and at 213, the data asset notification manager obtains the record from the database as the change and other data assets related to the data asset.

In an embodiment of 213 and at 214, the data asset notification manager monitors the database as a product catalogue associated with a specific retailer. The item code represents a specific product in the product catalogue and the change represents a price change in a price for the specific product. In an embodiment, the product catalogue is the catalogue 111 discussed above with the FIG. 1.

In an embodiment, at 215, the data asset notification manager identifies the resource from a plurality of resources based on a data type for the data asset.

At 220, the data asset notification manager processes the change in value to deliver the change in value and other data assets relevant to the data asset to one or more services defined in the customized rules.

According to an embodiment, at 221, the data asset notification manager identifies a communication channel for delivering the change in value and the other data assets from the customized rules.

In an embodiment of 221 and at 222, the data asset notification manager identifies the one or more services as mobile device services for mobile devices. In an embodiment, the mobile device services are the mobile apps 131 and the mobile devices are the mobile devices 130.

In an embodiment of 221 and at 223, the data asset notification manager identifies the one or more services as transaction terminal services for transaction terminals. In an embodiment, the transaction terminal services are the transaction managers 141 and the transaction terminals are the transaction terminals 140.

In an embodiment of 221 and at 224, the data asset notification manager identifies a condition that is satisfied in the customized rules before delivering the change in value and the other data assets to the one or more services.

In an embodiment of 224 and at 225, the data asset notification manager identifies the condition as a location-based condition for a current location of a device that executes the one or more services.

In an embodiment of 224 and at 226, the data asset notification manager identifies the condition as a time condition for a specific time that the change in value and the other data assets are to be delivered to the one or more services.

Figure 3:
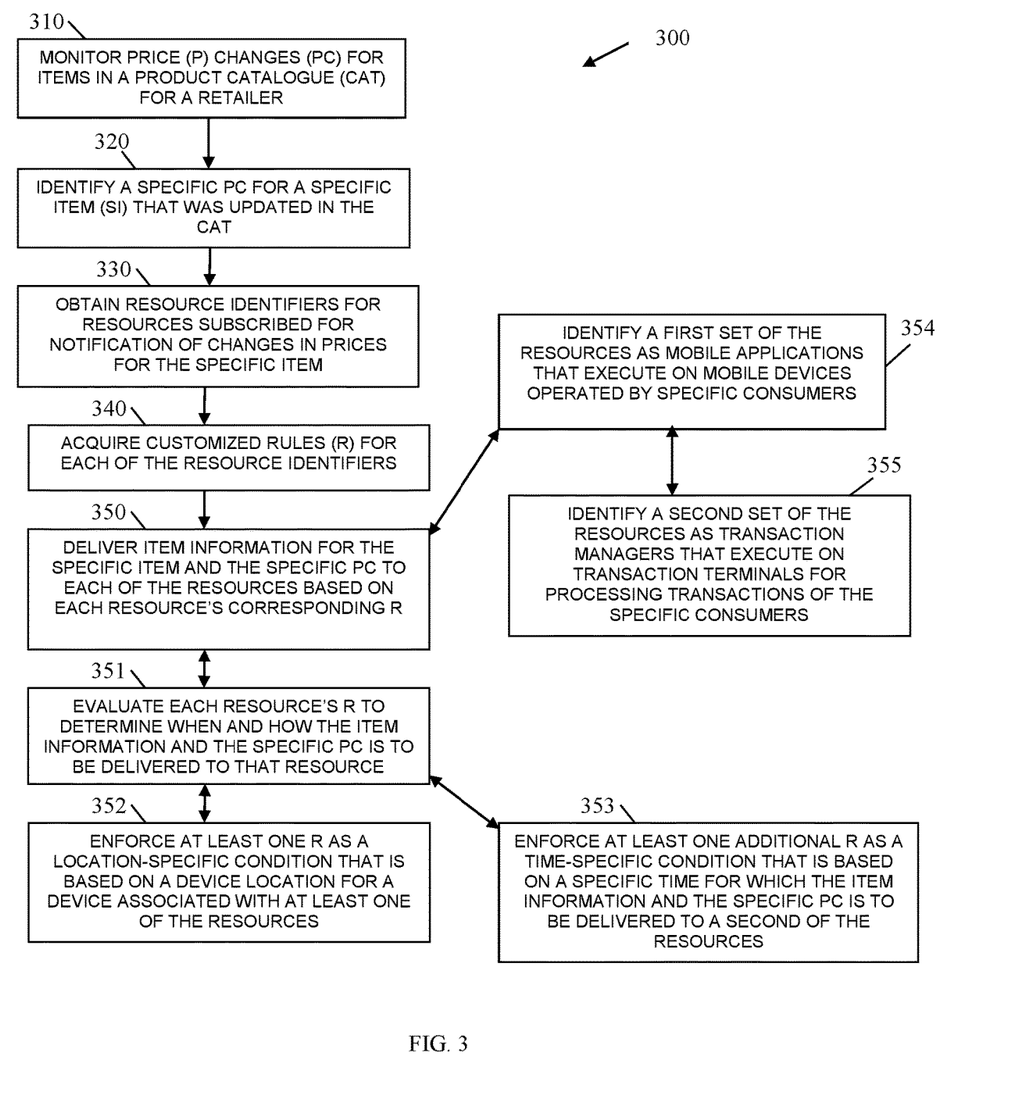
FIG. 3 is a diagram of another method for publishing and synchronization of data assets, according to an example embodiment.

FIG. 3 is a diagram of another method 300 for publishing and synchronization of data assets, according to an example embodiment. The software module(s) that implements the method 300 is referred to as an "item price notifier." The item price notifier is implemented as executable instructions programmed and residing within memory and/or a non-transitory computer-readable (processor-readable) storage medium and executed by one or more processors of a device. The processors that execute the item price notifier are specifically configured and programmed to process the item price notifier. The device that executes the item price notifier has access to one or more network connections during its processing. The network connections can be wired, wireless, or a combination of wired and wireless.

In an embodiment, the device that executes the item price notifier is a collection of servers logically cooperating as the ODSP 110. In an embodiment, the servers form a cloud-computing environment that services multiple retailer systems 120, multiple customer-operated devices 130, and/or multiple transaction terminals 140 of retailers.

In an embodiment, the item price notifier is a combination of: the listeners 112, the publisher 113, the API 121, and/or the method 200.

The item price notifier represents another and in some ways enhanced processing perspective from that which was described with the method 200 of the FIG. 2.

At 310, the item price notifier monitors price changes for items in a product catalogue. The items are data asset types and the price changes are values for an item data asset type. In an embodiment, the product catalogue is the catalogue 111 for a specific retail system 120.

At 320, the item price notifier identifies a specific price change for a specific item that was updated in the product catalogue.

At 330, the item price notifier obtains resource identifiers for resources subscribed for notification of changes in prices for the specific item. A resource can include a software service/application and/or a hardware device as used herein.

At 340, the item price notifier acquires customized rules for each of the resource identifiers.

At 350, the item price notifier delivers item information for the specific item and the specific price change to each of the resources based on each resource's corresponding customized rules.

In an embodiment, at 351, the item price notifier evaluates each resource's customized resources to determine when and how the item information and the specific price change is to be delivered to that resource.

In an embodiment of 351 and at 352, the item price notifier enforces at least one customized rule as a location-specific condition that is based on a device location for a device associated with at least one of the resources.

In an embodiment of 351 and at 353, the item price notifier enforces at least one additional customized rule as a time-specific condition that is based on a specific time for which the item information and the specific price change is to be delivered to a second of the resources.

In an embodiment, at 354, the item price notifier identifies a first set of the resources as mobile applications that execute on mobile device operated by specific consumers. In an embodiment, the mobile applications and the mobile applications 131 and the mobile devices are the mobile device 130.

In an embodiment of 354 and at 355, the item price notifier identifies a second set of the resources as transaction managers that execute on transaction terminals for processing transaction of the specific consumers. In an embodiment, the transaction managers are the transaction managers 141 and the transaction terminals are the transaction terminals 140. In an embodiment, the transaction terminals are one or more of: SSTs, ATMs, kiosks, and POS terminals.

Figure 4:
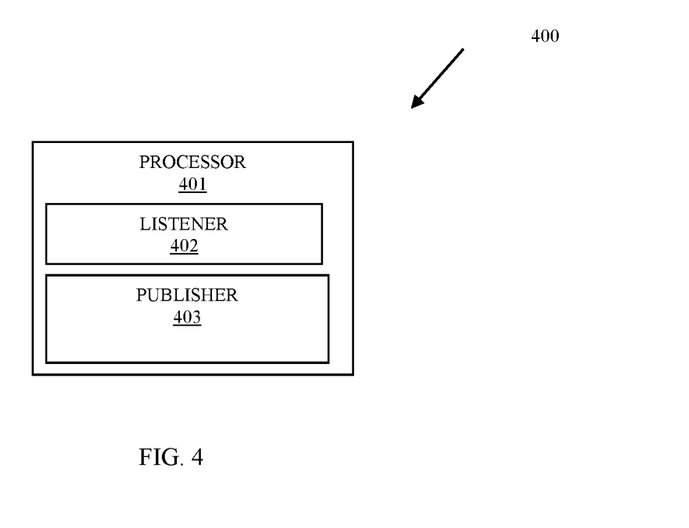
FIG. 4 is a diagram of a system for publishing and synchronization of data assets, according to an example embodiment.

FIG. 4 is a diagram of another system 400 for publishing and synchronization of data assets, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 includes a processor 401, a listener 402, and a publisher 403. The listener 402 and the publisher 403 are provided as executable instructions that execute on the hardware processor 401 from a non-transitory computer-readable medium of a server.

In an embodiment, the server is part of a collection of servers that are cooperating with one another to provide the ODSP 110. In an embodiment, the ODSP is part of a cloud-computing environment.

In an embodiment, the listener 402 is the listener 112.

In an embodiment, the publisher 403 is the publisher 113.

In an embodiment, the listener 402 and the publisher 403 combine to provide the processing discussed above with the: listener 112, the publisher 113, the API 121, the method 200, and/or the method 300.

The listener 402 when executed on the hardware processor 401 performs processing to: detect a change in value to a data asset of a data store; and provide the change and a record associated with the data asset in the data store to the publisher 403.

The publisher when executed on the hardware processor 401 performs processing to: receive the record and the change from the listener 402; identify a resource subscribed to be notified of the change; obtain customized rules for the resource; and deliver at least some of the record and the change to the resource in accordance with the customized rules.

In an embodiment, the resource is any of the above-mentioned types of user-operated devices 130 and/or any of the above-mentioned types of transaction terminals 140.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
monitoring, by a processor of a server that executes instructions, price changes for items in a product catalogue for a retailer;
identifying, by the processor, a specific price change for a specific item that was updated in the product catalogue;
obtaining, by the processor, resource identifiers for resources subscribed for notifications of changes in prices for the specific item, wherein the resources include one or more of software services, software applications, and hardware devices;
acquiring, by the processor, customized rules for each of the resource identifiers; and
delivering, by the processor, item information for the specific item and the specific price change to each of the resources based on each resource's corresponding customized rules, wherein delivering further includes:
processing each resource's corresponding customized rules and identifying when and how the delivering is to be processed for each resource, and wherein at least one of the customized rules is enforced as a location-specific condition that is based on a device location for a device associated with at least one of the resources;
identifying a first set of the resources as mobile applications that execute on mobile devices operated by specific consumers and identifying a second set of the resources as transaction managers that execute on transaction terminals for processing transactions of the specific consumers;
dynamically pushing the specific price change to the mobile applications when corresponding mobile devices are in predefined geographical areas as defined by the customized rules; and
enabling real-time price change notifications to entice customers to purchase particular items because customers can receive real-time price change notifications for the particular items, wherein corresponding prices are data asset values and corresponding item codes for the particular items are data asset types, and wherein not only can corresponding price changes themselves be provided but other useful information as to a specific store location and store name can be communicated to a customer through the mobile applications.

2. The method of claim 1, wherein delivering further includes evaluating each resource's customized rules to determine when and how the item information and the specific price change is to be delivered to a corresponding resource.

3. The method of claim 2, wherein evaluating further includes enforcing at least one second customized rule as a time-specific condition that is based on a specific time for which the item information and the specific price change is to be delivered to a second of the resources.

4. The method of claim 1, wherein obtaining further includes obtaining the resources from a table using an item code for the specific item.

5. The method of claim 4, wherein acquiring further includes obtaining corresponding customized rules for corresponding resources from the table using the item code.

6. The method of claim 1, wherein delivering further includes processing each resource's corresponding rules and identifying when and how the delivering is to be processed for each resource.

7. The method of claim 1, wherein identifying further includes detecting a record associated with the specific item being updated within the product catalogue.

8. The method of claim 1, wherein delivering further includes using an application programming interface to deliver the item information and corresponding specific price changes to each of the resources.

* * * * *